(12) United States Patent
Kim

(10) Patent No.: US 10,780,456 B2
(45) Date of Patent: Sep. 22, 2020

(54) METHOD AND JIG FOR FORMING PATTERN USING MAGNETIC INK AND MAGNETIC FORCE

(71) Applicant: IMCT Co., LTD., Paju-si, Gyeonggi-do (KR)

(72) Inventor: Jung Wook Kim, Paju-si (KR)

(73) Assignee: IMCT Co., LTD., Paju-si, Gyeonggi-do (KR)

( * ) Notice: Subject to any disclaimer, the term of this patent is extended or adjusted under 35 U.S.C. 154(b) by 0 days.

(21) Appl. No.: 16/107,178

(22) Filed: Aug. 21, 2018

(65) Prior Publication Data
US 2019/0176190 A1 Jun. 13, 2019

(30) Foreign Application Priority Data

Dec. 12, 2017 (KR) .................. 10-2017-0170491
Jul. 3, 2018 (KR) .................. 10-2018-0077295

(51) Int. Cl.
*B05D 5/06* (2006.01)
*B41M 1/26* (2006.01)
(Continued)

(52) U.S. Cl.
CPC ............. *B05D 3/207* (2013.01); *B05D 5/065* (2013.01); *B32B 27/08* (2013.01); *B41M 1/02* (2013.01);
(Continued)

(58) Field of Classification Search
CPC ... B05D 5/65; B05D 5/61; B05D 5/63; B05D 5/66; B05D 5/06; B05D 3/207; B05D 5/065; B05D 5/061; B05D 5/063; B05D 5/066; C23C 14/50; B25B 11/00; B25B 11/002; B25B 11/02; B42D 25/29; B42D 25/369; B42D 25/378; B41M 1/26; B32B 27/08
(Continued)

(56) References Cited

U.S. PATENT DOCUMENTS

2012/0205905 A1* 8/2012 Degott .................. B42D 25/24
283/72
2014/0077485 A1* 3/2014 Raksha ................ B41M 7/0072
283/67
(Continued)

FOREIGN PATENT DOCUMENTS

KR 10-1190539 A 11/2011
KR 10-2016-0127238 A 11/2016

*Primary Examiner* — Tabassom Tadayyon Eslami
(74) *Attorney, Agent, or Firm* — Novick, Kim & Lee, PLLC; Jae Youn Kim

(57) ABSTRACT

The present invention relates to a method and a jig for forming a pattern, the method and the jig being capable of realizing various and unique pattern designs due to magnetic particles included in the magnetic ink being distributed in various densities according to intensity of the magnetic force. Disclosed is a method and a jig for forming a pattern by using magnetic ink and magnetic force, the method including: preparing a jig which generating magnetic force, applying magnetic ink on a surface of a substrate to form a print layer, disposing the substrate configured with the print layer above the jig, forming a magnetic pattern on the print layer by applying magnetic force generated from the jig, and drying the print layer.

3 Claims, 12 Drawing Sheets

(51) Int. Cl.
  *B05D 3/00* (2006.01)
  *B41M 1/02* (2006.01)
  *B32B 27/08* (2006.01)
  *B41M 1/12* (2006.01)
  *B41M 1/06* (2006.01)

(52) U.S. Cl.
  CPC ............... *B41M 1/06* (2013.01); *B41M 1/12* (2013.01); *B41M 1/26* (2013.01)

(58) Field of Classification Search
  USPC ........... 269/65, 101, 262, 60, 71, 76, 8, 276; 414/793.2, 797.1, 606, 737; 427/130
  See application file for complete search history.

(56) References Cited

U.S. PATENT DOCUMENTS

| | | | |
|---|---|---|---|
| 2015/0158323 A1* | 6/2015 | Richert | B42D 25/30 283/85 |
| 2015/0352883 A1* | 12/2015 | Schmid | B05D 3/20 283/73 |
| 2018/0361776 A1* | 12/2018 | Nigatu | B42D 25/23 |

* cited by examiner

METHOD AND JIG FOR FORMING PATTERN USING MAGNETIC INK AND MAGNETIC FORCE

CROSS REFERENCE TO RELATED APPLICATION

The present application claims priority to Korean Patent Application No. 10-2017-0170491, filed Dec. 12, 2017, and Application No. 10-2018-0077295, filed Jul. 3, 2018, the entire disclosures of which are incorporated herein by reference in their entirety.

BACKGROUND OF THE INVENTION

Field of the Invention

The present invention relates generally to a method and a jig for forming a pattern using magnetic ink and magnetic force. More particularly, the present invention relates to a method and a jig for forming a pattern, the method and the jig being capable of realizing various and unique pattern designs due to magnetic particles included in the magnetic ink being distributed in various densities according to intensity of the magnetic force.

Description of the Related Art

As a technique related to a method of forming a pattern using magnetic ink, "a pattern forming method on a substrate using magnetic ink" is disclosed in Korean Patent Application Publication No. 10-2016-0127238 (hereinafter, referred to as 'related art').

The related art is a technique related to a method of forming a pattern on a substrate by using magnetic ink, the method including applying paint in which magnetic powders are mixed on a surface of a substrate, disposing at least two magnetic pads on the opposite surface of the substrate in a stacked manner such that the magnetic powders included in the paint form a pattern due to a magnetic field of the stacked magnetic pads, and curing the patterned paint.

In the related art, at least two anisotropic magnetic pads are stacked in various ways such that patterns such as a lattice, a diamond, a wave, and so on can be easily realized. In addition, a concentric pattern can be realized by rotating the stacked magnetic pads while the patterns are formed.

However, it is difficult to realize various patterns of design by overlapping or rotating two or more magnetic pads. Thus, it is difficult to meet the needs of consumers who want products with individual and unique designs that are difficult to find in ready-made products, or those who want products with differentiated designs from those of other companies.

DOCUMENTS OF RELATED ART (Patent Document 1) Korean Patent Application Publication No. 10-2016-0127238, entitled "pattern forming method on substrate using magnetic ink"; and (Patent Document 2) Korean Patent No. 10-1190539, entitled "coating film having pattern and method of manufacturing thereof"

SUMMARY OF THE INVENTION

Accordingly, the present invention has been made keeping in mind the above problems occurring in the related art, and the present invention is intended to propose a method and a jig for forming a pattern, the method and the jig being capable of realizing various and unique pattern designs (a decorative plate, a decorative film, a pattern on a container for products, etc., which will be described later as an application range of the present invention) by using magnetic ink and magnetic force.

In order to achieve the above object, there is provided a method of forming a pattern by using magnetic ink and magnetic force, the method including: preparing a jig, which generates magnetic force; applying liquid magnetic ink including chromatic color magnetic particles on a surface of a substrate to form a print layer; disposing the substrate configured with the print layer above the jig; forming a magnetic pattern on the print layer by applying magnetic force generated from the jig; and drying the print layer, wherein the jig used at the preparing of the jig is configured with a magnetic plate having a contour portion formed on an upper surface thereof in a relief pattern in order to generate a variation of a magnetic flux density applied from a print layer, at forming of the magnetic pattern, an intensity of the magnetic force density to be applied to each coordinate position on the print layer varies according to a distance difference between a surface of the contour portion and the print layer whereby a distribution of the magnetic particles in the magnetic ink is controlled, and at the drying of the print layer, the ink is dried and cured such that the distribution of the magnetic particles having chromatic color is formed to be a desired pattern.

In an embodiment of the present invention, the magnetic particles of the magnetic ink may be selected from the group consisting of a ferromagnetic substance, a paramagnetic substance, a soft ferrite, a metallic magnetic substance, a non-metallic magnetic substance, and mixtures thereof, and one or more magnetic substances having desired color to be expressed for the pattern may be used as the magnetic particles.

After the drying of the print layer, the method according to the present invention may further include: forming a UV pattern layer on an opposite surface of the substrate to realize a pattern shape; depositing a metal or a metal oxide on a surface of the UV pattern layer to form a thin color layer thereon; coating a surface of the color layer with a protection layer for covering the rear and for protection; and cutting the result undergoing the coating along a desired shape of an end product.

Meanwhile, a jig for forming a pattern by using magnetic ink and magnetic force according to the present invention is to apply magnetic force to a print layer, which is formed by applying magnetic ink on a surface of a substrate, to form a magnetic pattern, the jig including: a magnetic plate having a contour portion, which is formed on an upper surface thereof in a relief pattern, and applying magnetic force on a print layer, wherein an intensity of the magnetic force to be applied to the print layer varies according to a distance difference between a surface of the contour portion and the print layer such that a magnetic pattern is formed on the print layer.

In an embodiment of the present invention, the magnetic plate may include: an iron plate configured with the contour portion at an upper surface thereof, and receiving magnetic force and thus having magnetism; and a magnet configured as a magnet (permanent magnet or electromagnet), and contacting with the iron plate below the iron plate and transmitting the magnetic force to the iron plate.

In an embodiment of the present invention, the jig may be provided with a spacer to keep a space between the magnetic plate and the print layer, and the spacer may be configured as a column or a square frame, mounted on an edge of an upper surface of the magnetic plate.

According to a method and a jig for forming a pattern by using magnetic ink and magnetic force of the present invention, an intensity of the magnetic force applied to the magnetic ink applied to a substrate is varied by the jig to correspond to a pattern shape to be implemented such that it is possible to easily realize various and unique pattern designs by a simple process and method in which various complex colors and patterns are formed on a surface of a product made of a synthetic resin, which can be applied with magnetic ink, such as a decorative plate, a decorative film, etc.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
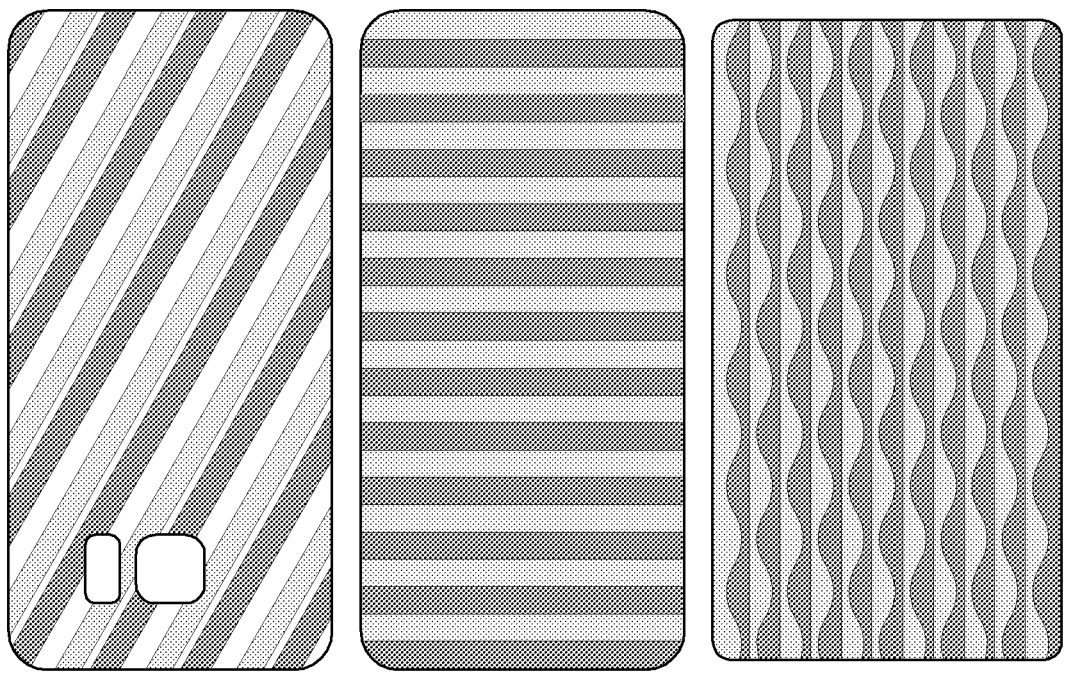
FIG. 1 is a photograph showing cell phone case products manufactured according to a method of forming a pattern by using magnetic ink and magnetic force, according to the present invention.

Hereinbelow, preferred embodiments of the present invention will be described in detail with reference to accompanying drawings. It should be understood that the shape and size of the elements shown in the drawings may be exaggeratedly drawn to provide an easily understood description of the structure of the present invention.

Figure 2:
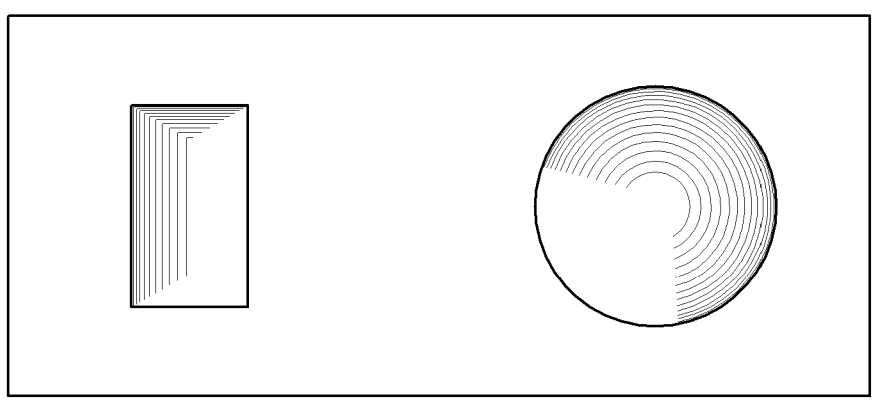
FIG. 2 is a photograph showing a decorative film in which three-dimensional shading patterns are variously expressed on a plane by the method of forming a pattern by using magnetic ink and magnetic force, according to the present invention.
Figure 3:
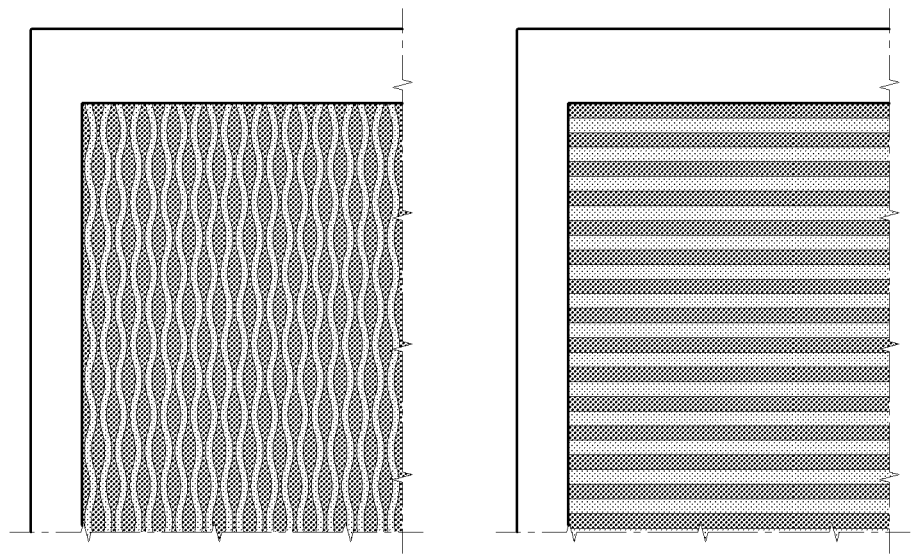
FIG. 3 is a photograph showing decorative film products manufactured by the method of forming a pattern by using magnetic ink and magnetic force, according to the present invention.
Figure 4:
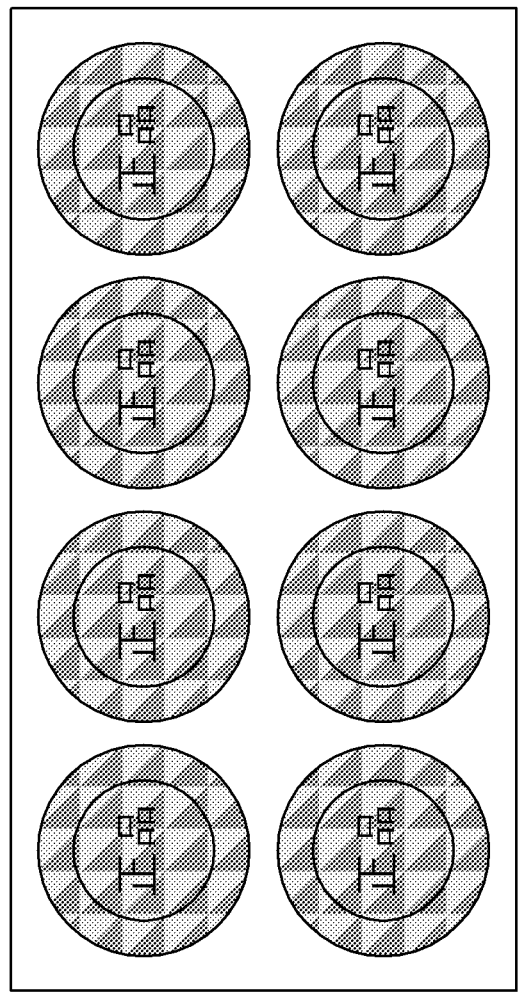
FIG. 4 is a photograph showing film sticker products manufactured by the method of forming a pattern by using magnetic ink and magnetic force, according to the present invention.

FIG. 1 is a photograph showing cell phone case products manufactured according to a method of forming a pattern according to the present invention; FIG. 2 is a photograph showing a decorative film in which three-dimensional shading patterns are variously expressed on a plane by the method of forming a pattern according to the present invention; FIG. 3 is a photograph showing decorative film products manufactured by the method of forming a pattern according to the present invention; and FIG. 4 is a photograph showing film sticker products manufactured by the method of forming a pattern by using magnetic ink and magnetic force, according to the present invention.

Referring to FIGS. 1 to 4, it is possible to apply a method of forming a pattern by using magnetic ink and magnetic force of the present invention to manufacture of various articles used to protect or beautify products, the articles being exemplified as a housing and an exterior case for various mobile devices, a case for home appliances, a decorative plate/sheet, a decorative film, a body and a lid for various containers such as a cosmetic container, etc. In particular, by performing the forming method which is easy to process, it is possible to express an original design pattern, which has conventionally been difficult to implement. In addition, according to the method of forming a pattern of the present invention, it is possible to reduce the number of process steps and process time for forming a designed pattern, and to improve the production yield.

Figure 5A:
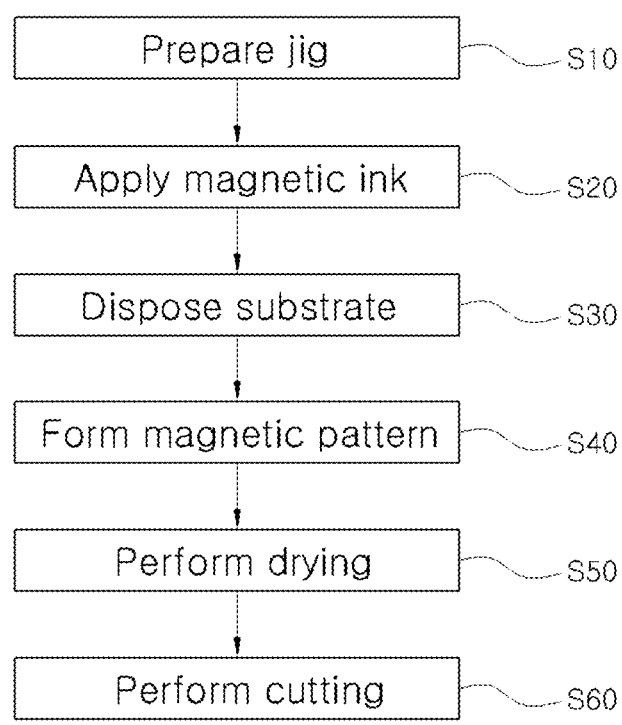
FIG. 5A is a process flow diagram of the method of forming a pattern by using magnetic ink and magnetic force, according to an embodiment of the present invention.
Figure 5B:
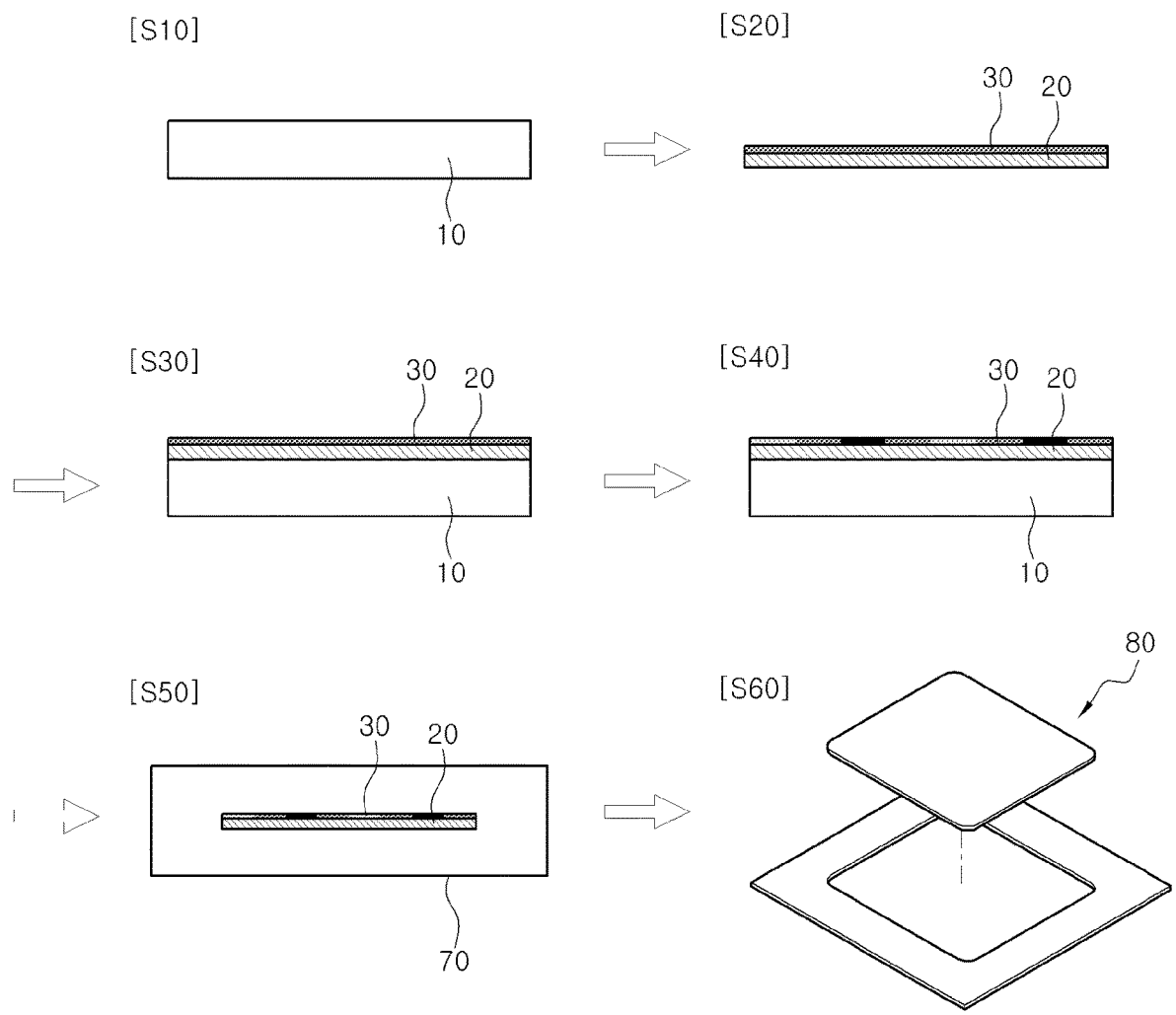
FIG. 5B depicts cross-sectional views illustrating the process steps of FIG. 5A.

FIG. 5A is a process flow diagram of the method of forming a pattern by using magnetic ink and magnetic force, according to an embodiment of the present invention; and FIG. 5B depicts cross-sectional views illustrating the process steps of FIG. 5A.

As shown in FIGS. 5A and 5B, the process of the method of forming a pattern by using magnetic ink and magnetic force of a jig according to an embodiment of the present invention includes jig preparing step S10, magnetic ink applying step S20, substrate disposing step S30, magnetic pattern forming step S40, and performing drying step S50. The magnetic ink used in the present invention includes small magnetic particles having chromatic color. The magnetic particles are fine particles which move in a liquid ink by being attracted to an external magnetic force, such as fine particles having a magnetic property, which are moved by magnetic force in a liquid ink under the influence of a magnetic force. Alternatively, a substance may be used as the magnetic particles as long as the substance is attracted by magnetism and moves in a liquid ink, like iron particles with small diameters (several to several hundreds of μm) in chromatic color.

In addition, it is possible that two or more kinds of fine magnetic particles and iron particles having different particle diameters and/or different magnetisms are used for the chromatic color.

At the jig preparing step S10, a jig 10 generating magnetic force is prepared for forming a shape to be formed.

At the jig preparing step S10, the jig 10 according to the embodiment of the present invention may be provided as one among various structures according to a shape of a pattern to be formed, work environment, etc.

Figure 6:
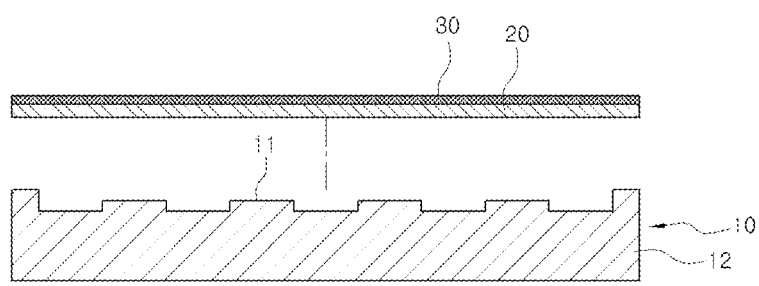
FIG. 6 is a cross-sectional view illustrating a mounted state of a jig used in a method according to an embodiment of the present invention, in which the jig is configured as a simple relief of an engraved and embossed structure.
Figure 7A:
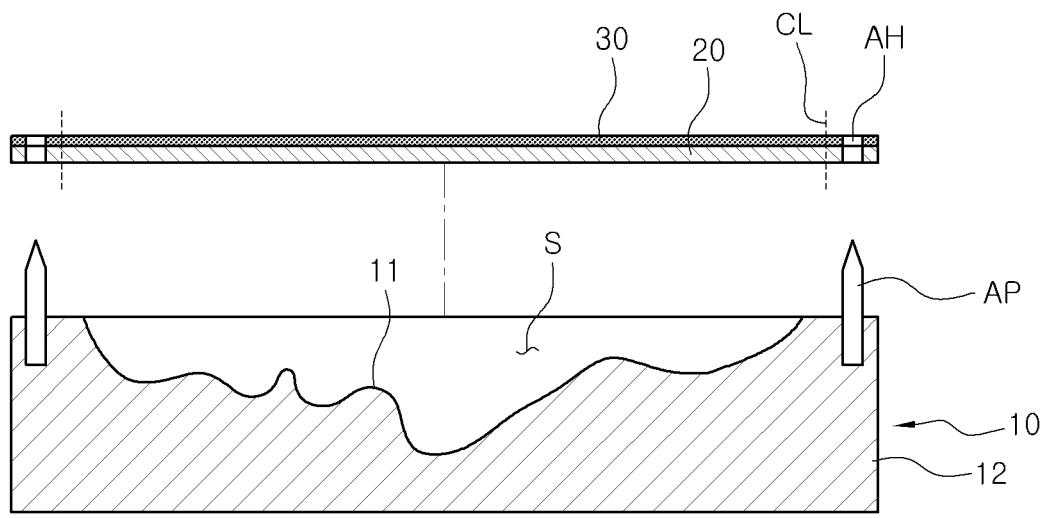
FIG. 7A is a cross-sectional view illustrating a mounted state of a jig used in a method according to an embodiment of the present invention, in which the jig is configured to express a face of a person in three dimensions by engraving and by the engraved depth.
Figure 7B:
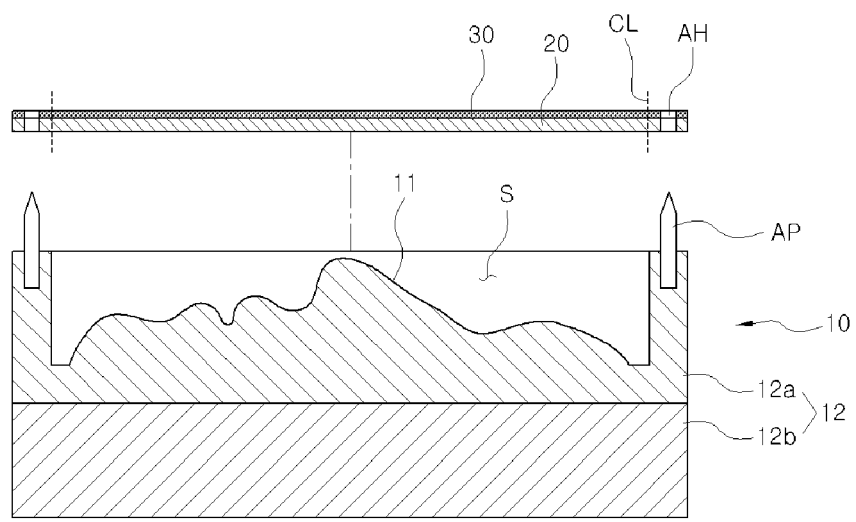
FIG. 7B is a cross-sectional view illustrating a mounted state of a jig used in a method according to an embodiment of the present invention, in which the jig is configured to express a face of a person in three dimensions by embossing and by the embossed depth.
Figure 8:
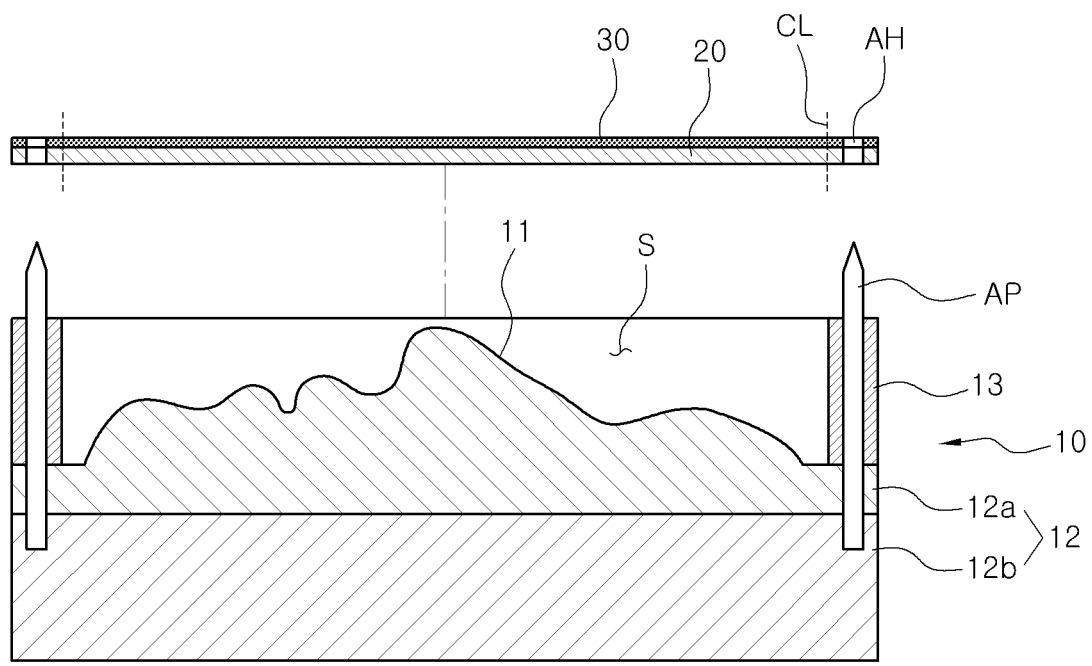
FIG. 8 is a cross-sectional view illustrating an assembled structure of a jig and a substrate used in a method according to an embodiment of the present invention, in which the substrate is supported by spacers to be disposed above the jig so as to be spaced from the jig for as a preparation for a pattern forming process.

FIGS. 6, 7A, 7B, and 8 show such various structures of the jig prepared at the jig preparing step S10. FIGS. 6, 7A, and 7B show cross-sectional views of a structure of the jig 10 according to embodiments of the present invention, and FIG. 8 shows that a spacer is provided at the jig such that a substrate 20, which is provided with a print layer 30 configured by applying the magnetic ink, is fixed.

The jig 10 used at the jig preparing step S10 according to the present invention is configured with a magnetic plate 12 having a contour portion 11 formed on a surface thereof in a relief pattern.

When a simple pattern is to be realized, it is possible that the contour portion 11 of the jig 10 is simply configured as an engraved and embossed structure as shown in FIG. 6.

However, when a fine and detailed relief is to be realized such as expressing saturations, three-dimensional effects, and shadows of patterns to be formed on products, it is required that each coordinate on the contour portion 11 is configured to have an individual depth as shown in FIGS. 7A and 7B.

The plate-shaped magnetic plate 12 is configured as a permanent magnet or an electromagnet, and approaches the print layer 30 which will be described later, and then generates magnetic force. Here, as shown in FIGS. 6 and 7A, the magnetic plate 12 may be configured with the contour portion 11 directly. Alternatively, as shown in FIG. 7B, the magnetic plate 12 may be configured with a magnet 12b at one surface thereof and receives magnetic force, and with an iron plate 12a at an opposite surface thereof, the iron plate 12a facing the substrate to generate the magnetic force and being configured with the contour portion 11.

Meanwhile, the contour portion 11 may be configured in various shapes corresponding to a shape to be implemented on products.

The contour portion 11 is configured to have a three-dimensional effect by a relief method. Here, the contour portion 11 includes an engraved or embossed shape on an upper surface of the magnetic plate 12, or a combination thereof.

In order to form a repetitive simple pattern, the contour portion 11 of the jig may be configured with a structure in which concavities and convexities are simply repeated as shown in FIG. 6.

Alternatively, as shown in FIGS. 7A and 7B, the contour portion 11 of the jig may be configured as a face shape of a specific person in a half three-dimension. It should be understood that various shapes such as an animal, a plant, a building, an artwork, etc. may be configured in three dimensions instead of the face shape of the person.

As described above, in order to form a shape of the contour portion to implement the present invention, as in the case of the jig structure of FIG. 7A, the contour portion 11 may be formed directly on the upper surface of the magnetic plate 12 by mechanical machining such as numerical control (NC) machining, grinding, etc. Alternatively, as in the case of the lower structure of the jig of FIGS. 7B and 8, the contour portion 11 may be configured on the iron plate 12a attached to the separate magnet 12b (permanent magnet or electromagnet).

As shown in FIG. 7A, in the case of using a permanent magnet as the magnetic plate 12, in order to form the permanent magnet on the contour portion 11, a method is performed in which ferrite powders are put into a mold and then sintered. Specifically, according to the method of manufacturing the magnetic plate having the contour portion, the ferrite powders are sintered to manufacture a ferrite plate and exposed to strong magnetism by advancing an electromagnet, etc. toward the ferrite plate such that the ferrite plate is magnetized beyond a threshold which is to be restored against magnetic force whereby the ferrite plate becomes the magnetic plate. Accordingly, the ferrite plate is manufactured as the magnetic plate 12 having a desired contour portion in the present invention. Here, it is preferable to fabricate a three-dimensional shape corresponding to the contour portion 11 on the mold for the sintering process in advance to manufacture the magnetic plate 12 having the contour portion 11.

As another method of forming the contour portion on the permanent magnet provided as the magnetic plate, a surface of the permanent magnet provided as the magnetic plate is directly machined to manufacture a jig itself having a contour portion thereon. Here, the ferrite used to form the permanent magnet, which is provided as the magnetic plate and capable of being machined, may be made of Mn—Zn or Ni—Zn ceramic magnetic material, or a semiconductive ceramic.

In the case of forming the contour portion on the iron plate 12a and attaching the iron plate 12a to the magnet 12b to configure the magnetic plate 12 as shown in FIGS. 7B and 8, the magnet 12b that permeates magnetic force on the iron plate 12a may be provided as a permanent magnet or an electromagnet. In the case of changing the contour portion mold, it is preferable to use an electromagnet as the magnet 12b because the iron plate 12a is easily separated from the magnet 12b after cutting off a current supply.

As described above, in the case of the magnetic plate 12 which is configured with the iron plate 12a and the magnet 12b, with respect of configuring the contour portion 11 on an upper portion of the iron plate 12a, machining the contour portion by a method such as casting or cutting may be easy to perform compared to machining a contour on the magnet. In addition, it is possible that only the iron plate 12a is replaced with another one and the replacement is attached to the magnet 12b during the process such that a process for forming a pattern with various shapes is performed quickly, and it is advantageous from the viewpoint of lowering the manufacturing cost of the jig as compared with the jig constituted entirely by magnets.

Meanwhile, as described above, in the jig 10, which can be variously embodied according to the present invention, an intensity of the magnetic force applied from the magnet plate 11 to the print layer 30 varies according to a distance difference between a surface of the contour portion 11 and the print layer 30 which is applied on the substrate but not cured.

That is, a surface of the contour portion 11 located near the print layer 30 exerts a relatively strong magnetic force on the print layer 30, and a surface of the contour portion 11 located farther away from the print layer exerts a relatively weak magnetic force on the print layer 30. Accordingly, a color density of the magnetic particles expressed by adjusting a scattering degree of the magnetic particles distributed on the print layer 30 is adjusted whereby it is possible to express a pattern shape in which the color density of the magnetic particles to be expressed is adjusted.

As described above, the difference in the intensity of the magnetic force applied to each coordinate position on the print layer 30 in the contour portion 11 of the magnetic plate 12 varies depending on the difference in the distance between the surface of the contour portion 11 and the print layer 30. However, when constructing the enclosure of the jig as a chamber or further constructing the structure of the jig, a method may be employed in which a contour space S is in a vacuum state or composed of an inert gas. The method will provide a process environment where the permeability, in which a magnetic flux of the contour portion 11 of the jig 10 reaches the magnetic particles in the print layer 30, differs from that of the atmospheric environment.

In addition, it is possible that a liquid substance capable of raising and lowering the permeability in the contour space S is distributed in the contour space S, and such a method may be utilized as another technique for realizing the present invention to more finely express a chromatic color density of the pattern such as color density, shade, etc. according to a depth difference of the relief. Furthermore, it is possible that the maximum depth of the contour space S in the magnetic plate may be lowered, and such a method may be utilized as another technique for realizing the present invention to manufacture the entire thickness of the magnetic plate 12 thinner.

The technical background for the utilization of the technique of the present invention is to consider and utilize a natural phenomena where the magnetic flux reaching the magnetic particles in the print layer is proportional to the square of the separated distance and inversely proportional to the permeability.

Meanwhile, in the present invention, in order to operate in a state in which the print layer 30 and the magnetic plate 12 are fixed to each other as shown in FIGS. 7A and 7B, it is preferable that an align pin AP is fixed to the edge of the magnetic plate 12 in an erect state, and the print layer 30 is provided with an align hole AH for fitting and fixing the align pin AP therethrough such that it is possible to perform a pattern forming process in a state where the print layer 30 is fixed to the magnet plate 12. As described above, in the case that the print layer 30 has the align hole AH, an unnecessary portion of the product undergoing the pattern forming process may be finished by a subsequent process of cutting along a cutting line CL according to a method such as press blanking.

The fixing method using the align pin AP and the align hole AH may be replaced with other fixing structures of the related arts which are already known to those skilled in the art. For example, although not shown in the accompanying drawings, the print layer 30 may be fixed to the magnetic plate by a clip, or the print layer 30 may be spread by a plurality of robot fingers provided on a robotic arm or by an adsorption type-robotic arm such that the pattern forming process using the magnetic force of the present invention may be performed.

Meanwhile, with respect to configuring the jig 10 in the present invention, a spacer 13 may be provided to keep a predetermined distance between the magnetic plate 12 and the print layer 30 as shown in FIG. 8. The spacer 13 may be implemented as multiple columns disposed to be spaced apart from each other by a predetermined distance on an upper surface of the magnetic plate 12 as shown in a cross-sectional area in FIG. 8. Alternatively, instead of the multiple columns, the spacer 13 may be implemented as a form of a square frame supporting the entire edge of the magnetic plate. In the case of the multiple columns as the spacer 13, it is preferable that the multiple columns are adjustable in height, and such height adjustment may be implemented by a thread engagement such as a bolt-nut coupling.

The spacer 13 may be fitted with the align pin AP provided on the magnetic plate 12 and fixed. It is desirable that the spacer 13 is made of a non-magnetic material to avoid a magnetic effect on the print layer 30.

In addition to the above-described structure, the spacer 13 may be provided with a variety of devices interposed between the magnetic plate 12 and the print layer 30 to maintain the distance thereof.

Hereinafter, the method of forming a pattern by using magnetic ink and magnetic force according to the embodiment of the present invention will be described subsequently with reference to FIGS. 5A and 5B again.

At the magnetic ink applying step S20, the magnetic ink is applied on a surface of the substrate 20 to form a print layer 30.

Here, the substrate 20 may be made of a synthetic resin film. It is preferable that the substrate 20 may be made of a film material selected from the group consisting of polymethyl methacrylate (PMMA), polycarbonate (PC), polyethylene terepthalate (PET), polyurethane (PU), thermoplastic polyurethane (TPU), polypropylene (PP), and polyvinyl chloride (PVC), which are excellent in transparency. In addition to the above-described synthetic resin film, various kinds of materials and shapes may be applied to the substrate 20 depending on products on which a pattern is to be implemented.

The magnetic ink applying step S20 may be performed by the silk printing method. In addition, the magnetic ink applying step S20 can be performed by various known methods such as spraying method, gravure printing method, offset printing method, etc., in which the magnetic ink is applied to the substrate to form the printing layer.

With respect to the magnetic ink, a transparent liquid material may be used as a base material of the ink composition of the magnetic ink such that the print layer is formed in not only one layer but also two or more layers. In addition, when forming the print layer in multiple layers as described above, it is possible that different magnetic inks are used for each print layer such that the multiple layers are expressed in multicolor when viewed. In addition, it is possible that light color is applied to the outer layer of the multiple layers so as to project light such that colors of the multiple layers seem to be mixed.

At the substrate disposing step S30, the substrate 20 formed with the print layer 30 is disposed above the jig 10. The substrate 20 is fixed to be disposed above the jig 10 by using an additional clamping device. Here, it is preferable that the substrate 20 is disposed in which the surface on which the print layer 30 is formed is located at the upper side.

At the magnetic pattern forming step S40, the magnetic force generated from the jig 10 is applied to the print layer 30 formed with the substrate 20 to form the magnetic pattern. By applying the magnetic force to the print layer 30, the magnetic particles included in the magnetic ink are distributed in various densities according to an intensity of the magnetic force, whereby the magnetic pattern is formed on the print layer 30.

That is, on the print layer 30, the magnetic particles are distributed in high density on a portion where the magnetic force is strongly applied by the jig 10, and the magnetic particles are distributed in low density on a portion where the magnetic force is weakly applied by the jig 10, such that the difference in color density occurs due to the distribution of the magnetic particles on print layer 30. Accordingly, a pattern shape is formed on the print layer 30 due to the difference in color density, the pattern shape being capable of expressing color density and shade.

At the magnetic pattern forming step S40, the time for the print layer 30 to be exposed to the magnetic force is appropriately set by repeated experiments for realizing the present invention depending on an intensity of the magnetic force (magnetic flux density) applied by the jig 10, characteristics of the magnetic ink (curing time of the ink, grain sizes and magnetism of the magnetic particles), and so on.

At the performing drying step S50, the print layer 30 formed with the magnetic pattern is dried. In order to dry the print layer, putting the substrate 20 into a drying chamber 70 at high temperature, drying by ultraviolet light, natural drying, etc. may be utilized depending on characteristics of the magnetic ink.

The resulting product 80 undergoing the performing drying step S50 may be completed after the performing cutting step S60 in which the resulting product 80 is cut along a cutting line CL shown in FIGS. 7A and 7B.

The performing cutting step S60 may be performed in various ways such as a laser cutting, an NC machining, a press blanking by using a mold, and so on.

Figure 9A:
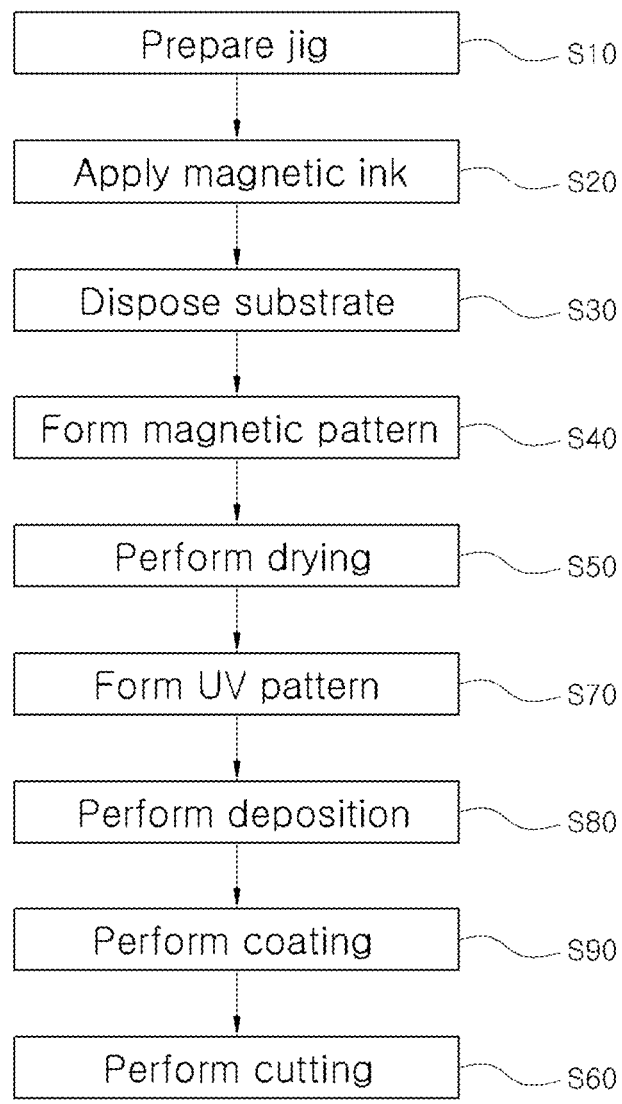
FIG. 9A is a process flow diagram illustrating a method of manufacturing a product by using a single magnetic pattern forming process, according to the present invention.
Figure 9B:
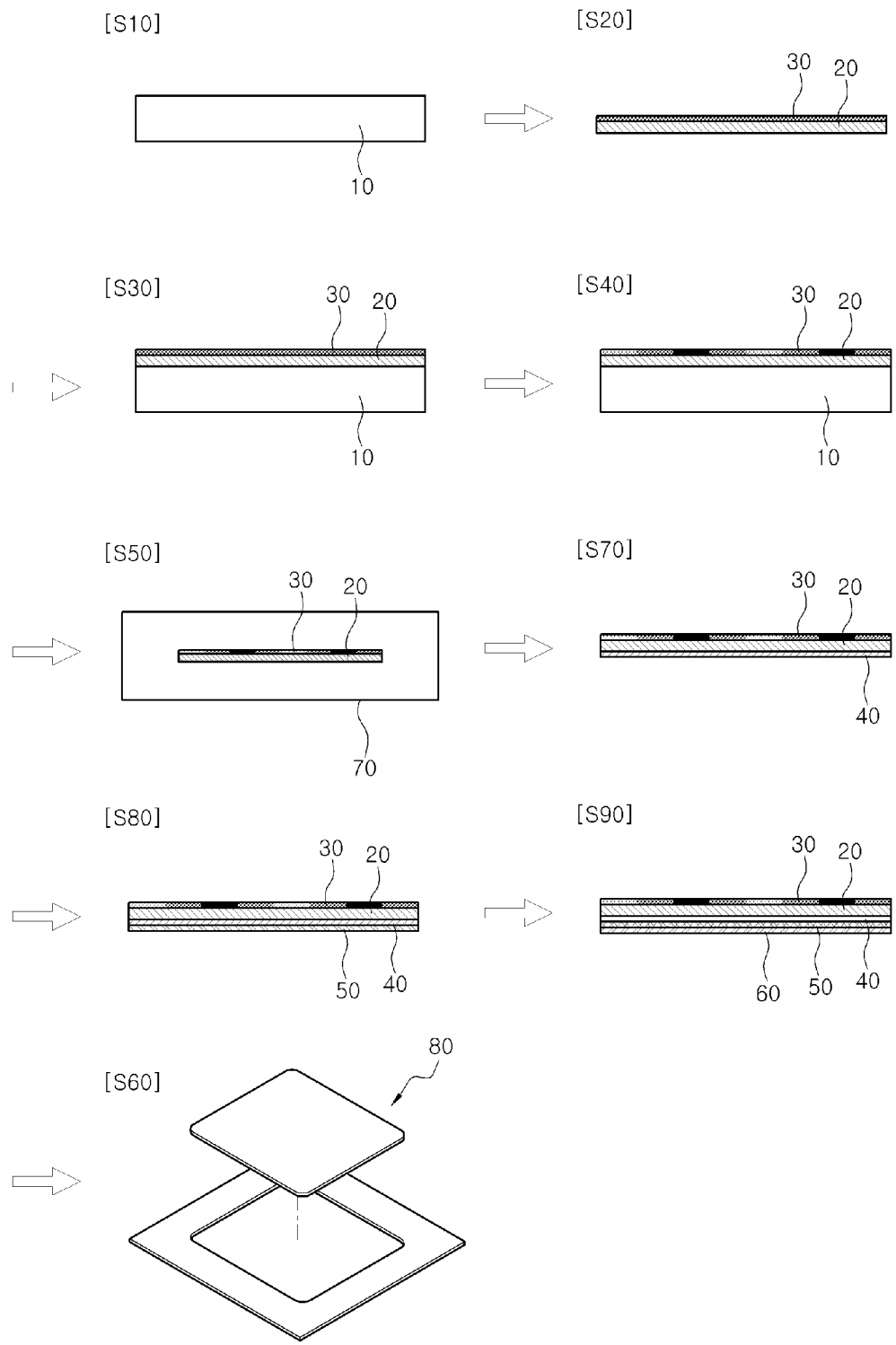
FIG. 9B depicts cross-sectional views illustrating the process steps of FIG. 9A.

Meanwhile, as described above with reference to FIGS. 5A and 5B, the method of forming a pattern by using the magnetic ink and the magnetic force according to the present invention may further include UV coating process as shown in FIGS. 9A and 9B. In describing the process like reference numerals are used to identify like elements throughout different drawings, thus a repeated description for the same will be omitted.

Referring to FIGS. 9A and 9B, in order to perform UV coating on the pattern, the present invention further includes UV pattern forming step S70, performing deposition step S80, and performing coating step S90, between the performing drying step S50 and the performing cutting step S60, which have been described with reference to FIGS. 5A and 5B.

At the UV pattern forming step S70, a UV pattern layer 40 is formed on an opposite surface of the substrate 20 undergoing the performing drying step S50 (that is, in the substrate, an opposite surface of the surface on which the print layer is formed) to realize a pattern shape. The UV pattern is formed on the opposite surface of the substrate such that it is possible to form the UV pattern layer 40 to have various designs. Forming the UV pattern layer 40 may be performed by methods known before application of the present invention such as a method of printing with UV ink and then UV curing, and a method of using a UV mold, and so on.

At the performing deposition step S80, a metal or a metal oxide is deposited on an upper surface of the UV pattern layer 40. Accordingly, in addition to the color expression by the magnetic ink of the print layer 30 which is an upper portion of a product, a lower portion of the product is provided with a thin color layer 50, and the color layer 50 resulting from the deposition is seen through the magnetic ink print layer 30 disposed above the color layer. At the performing deposition step S80, the thin color layer 50 is formed by depositing a metal or a metal oxide on the surface of the UV pattern layer 40.

At the performing coating step S90, a protection layer 60 is formed the color layer 50. Here, a coating process such as UV coating, laminating, etc. is performed on the surface of the color layer 50 whereby the protection layer 60 is formed, the protection layer 60 protecting the color layer 50 resulting from the deposition and shielding the color layer 50 from light to make the color visible at the top.

The resulting product 80 undergoing the performing coating step S90 is completed after the performing cutting step S60.

Meanwhile, according to the present invention, the pattern formation by the magnetic ink may be performed not only a single time, but also performed twice or more with magnetic ink including different colors of magnetic particles such that a multicolor pattern is formed.

Figure 10A:
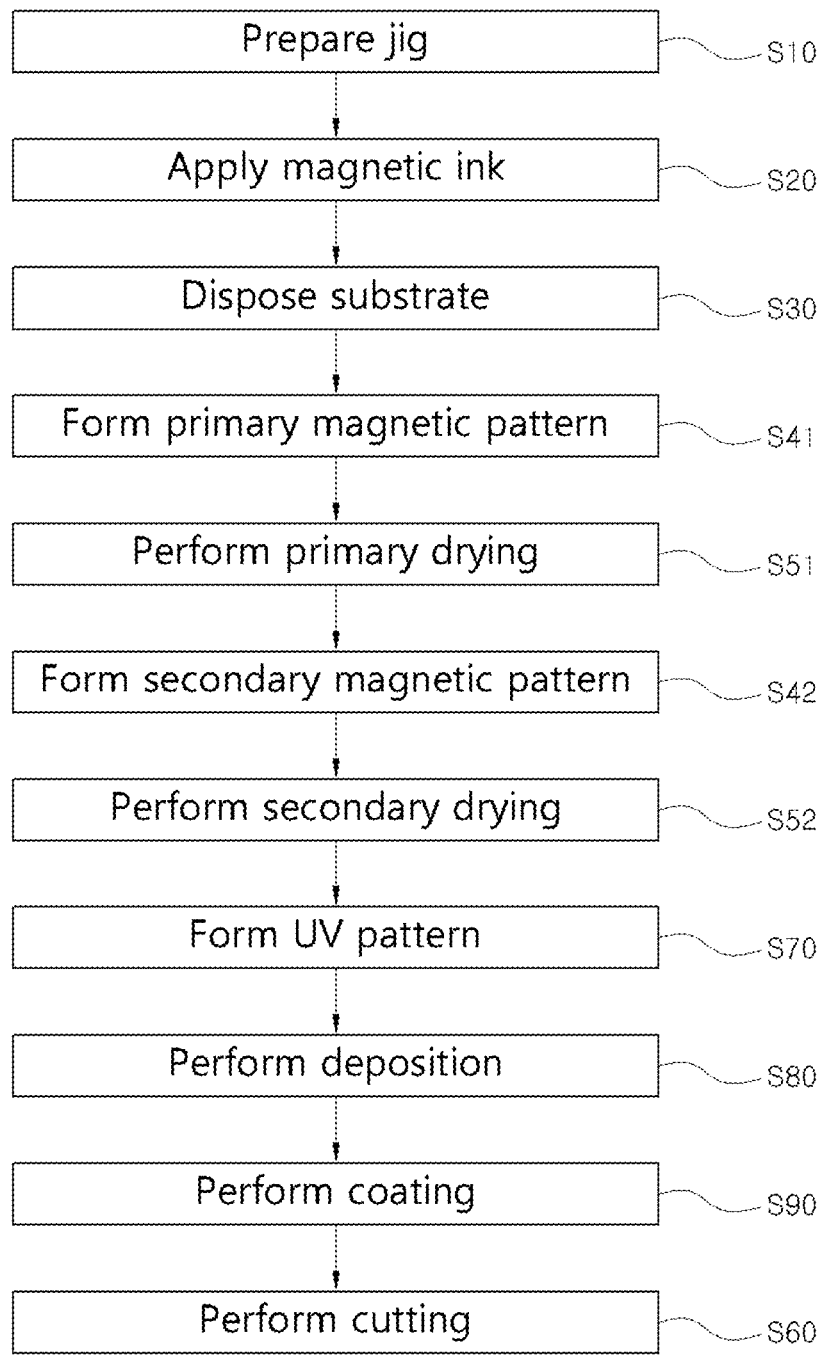
FIG. 10A is a process flow diagram illustrating a method of manufacturing a product by performing magnetic pattern forming process two times, according to the present invention.

That is, with respect to the process shown in FIGS. 5A and 5B of the present invention which forms a pattern by the magnetic ink having magnetic particles with chromatic color and by a magnetic force density control of the magnetic plate for controlling the distribution of the magnetic particles, the process may be performed twice as reference numerals S41 to S52 shown in FIG. 10A. Alternatively, the process may be performed in a plurality of times more than twice, if necessary. As described above, if the process is performed multiple times, different color magnetic ink is applied at each process to form print layers and the print layers are applied with the magnetic force, and magnetic plates having various contour patterns are used. Then, as a cross-sectional structure of the product in FIG. 10B, the pattern formation is performed in which a first print layer application and a second print layer application are performed at different positions, that is, a coordinate position where to concentrate the magnetic particles for representing color is not superimposed on other coordinate positions.

Figure 10B:
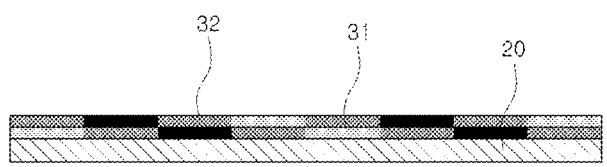
FIG. 10B is an exemplary cross-sectional view illustrating a double color pattern-resulting product manufactured by performing two times of magnetic pattern forming process of FIG. 10A.

Furthermore, according to the present invention, when the magnetic ink particles in an outer layer, which is the top layer, in FIG. 10B, are light color, the color is mixed with dark color of a lower layer and expressed on the outside. Thus, unlike the case of FIG. 10B, a coordinate where the magnetic force is concentrated is partially or entirely superimposed to express multicolor. That is, according to the present invention, one method among a method of forming a second print layer on the first print layer cured at the upper portion of the substrate, and when it is possible that second and third print layers may be formed in a consecutive order, a method of using the jig having the same magnetic plate, which is used at the magnetic pattern formation of the first print layer 30, to form each different print layer, and a method of using jigs each having a magnetic plate configured with a different relief pattern is selected to perform a process such that non-superimposed multicolor pattern, a superimposed multicolor pattern, or a partially superimposed multicolor pattern may be formed.

Meanwhile, with respect to the process of the embodiment of the present invention, among the UV pattern forming step S70, the performing deposition step S80, and the performing coating step S90 of FIG. 10A, any one of the UV pattern forming step S70 and the performing deposition step S80 may be omitted. In addition, with respect to using of the substrate, the performing coating step S90 may be omitted when a colored synthetic resin capable of light-shielding the rear is used such that a color pattern formed by the magnetic ink is seen clearly.

Although the specific embodiments of the present invention have been described for illustrative purposes with reference to the accompanying drawings, and should not be construed as being restrictive. Those skilled in the art will appreciate that various modifications, additions and substitutions are possible, without departing from the scope and spirit of the invention. In addition, respective exemplary embodiments may be independently carried out, and implemented together according to an associated relation. Accordingly, the scope of the present invention is defined only by the accompanying claims and their equivalents if appropriate.

What is claimed is:

1. A method of forming a magnetic pattern, the method comprising:
preparing a jig configured to generate magnetic force;
applying magnetic ink including magnetic particles on a surface of a substrate to form a print layer;
disposing the substrate having the print layer above the jig;
forming the magnetic pattern on the print layer by applying the magnetic force generated from the jig; and
drying the print layer,
wherein the jig includes a magnetic plate having a contour portion formed on an upper surface thereof in a relief pattern,
wherein, in the forming of the magnetic pattern, an intensity of the magnetic force to be applied to each coordinate position on the print layer is adjusted by adjusting a distance between a surface of the contour portion and the print layer whereby distribution of the magnetic particles in the magnetic ink is controlled, and
wherein, in the drying of the print layer, the magnetic ink is dried and cured such that the magnetic particles are formed in the magnetic pattern,
wherein the magnetic particles of the magnetic ink include at least one of a ferromagnetic substance, a paramagnetic substance, a soft ferrite, a metallic magnetic substance, a non-metallic magnetic substance, or a mixture thereof, and
wherein the magnetic plate includes:
an iron plate having the contour portion on an upper surface thereof, the iron plate being configured to receive the magnetic force so as to have magnetism; and
a magnet being directly adjacent to the iron plate to transmit the magnetic force to the iron plate, the magnet being a permanent magnet or an electromagnet,
wherein the jig further includes a spacer to keep a space between the magnetic plate and the print layer, the spacer having one or more columns mounted on or in an edge of the upper surface of the magnetic plate, and
wherein a surface of each of the columns is at least partially threaded such that a position of the spacer is adjustable so as to adjust the distance between the surface of the contour portion and the print layer.

2. The method of claim 1, further comprising:
forming a second print layer on an upper portion of the print layer by applying the magnetic ink one more time,
wherein the forming of the second print layer is performed using the same jig used when forming the magnetic pattern of the print layer or using a second jig having a second magnetic plate having another relief pattern different from the relief pattern.

3. The method of claim 1, further comprising:
forming a UV pattern layer on an another surface of the substrate;
depositing a metal or a metal oxide on a surface of the UV pattern layer to form a thin color layer thereon;
coating a surface of the color layer with a protection layer; and
cutting the coated substrate having the print layer to have a shape of an end product.

* * * * *